United States Patent

[11] 3,593,958

| [72] | Inventor | Klaus P. Mueller<br>Goshen, Ind. |
|---|---|---|
| [21] | Appl. No. | 831,043 |
| [22] | Filed | June 6, 1969 |
| [45] | Patented | July 20, 1971 |
| [73] | Assignee | Robertshaw Controls Company<br>Richmond, Va. |

[54] PNEUMATICALLY OPERATED VALVE MEANS AND PARTS THEREFORE OR THE LIKE
12 Claims, 7 Drawing Figs.

[52] U.S. Cl............................................. 251/61.4,
251/366, 92/98
[51] Int. Cl.......................................................F16k 31/12,
F16i 3/00
[50] Field of Search............................................ 251/61,
61.2, 61.3, 61.4, 61.5, 331; 92/98, 128

[56] References Cited
UNITED STATES PATENTS
| 2,619,986 | 12/1952 | Goepfrich | 251/331 X |
| 3,012,751 | 12/1961 | Hauser | 251/61 X |
| 3,241,805 | 3/1966 | Schumann | 251/61.4 X |
| 3,421,732 | 1/1969 | Golden | 251/61 X |
| 3,429,333 | 2/1969 | Schoepe et al | 251/367 |

Primary Examiner—Arnold Rosenthal
Attorneys—Auzville Jackson, Jr., Robert L. Marben and Candor, Candor & Tassone ABSTRACT: A pneumatically operated device having a pair of cup-shaped housing members provided with cam-locking means at the respective open end of the housing members to secure the open ends together in compressed relation therebetween, a flexible diaphragm having an outer peripheral means disposed between the compressed-together open ends of the housing members so that the diaphragm means is sealed thereto and cooperates with one of the housing members to define a chamber therebetween. The flexible diaphragm is operatively associated with a valve member for controlling the opening and closing of a valve seat means detachably carried by one of the housing members.

INVENTOR.
KLAUS P. MUELLER

HIS ATTORNEYS

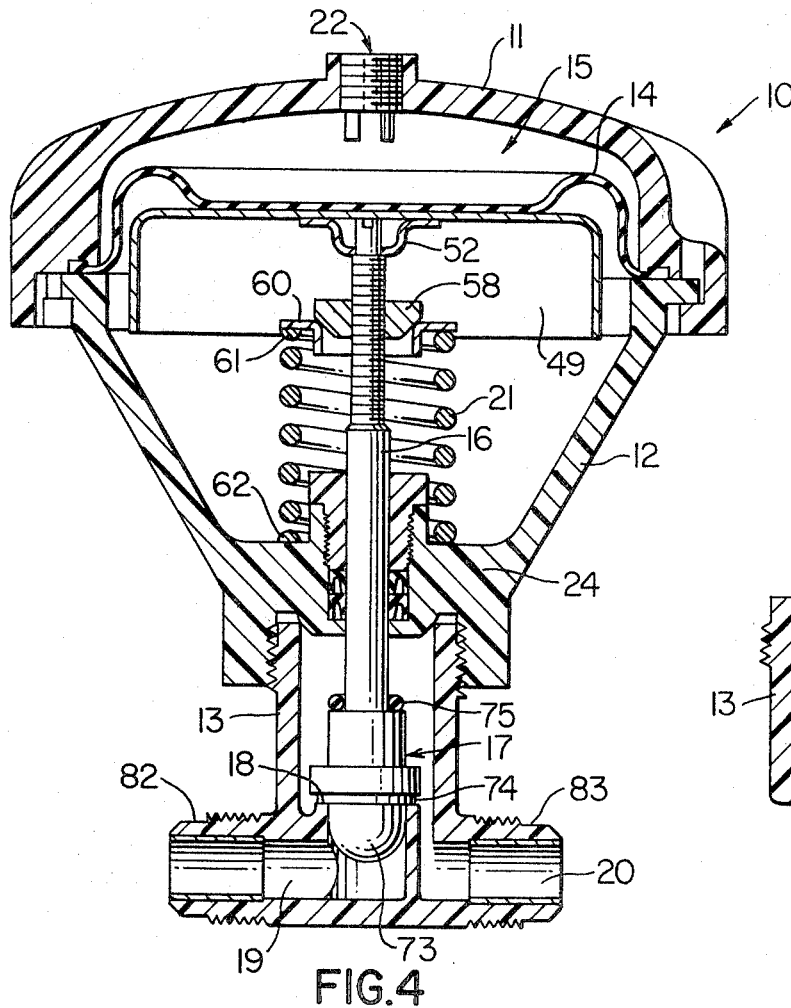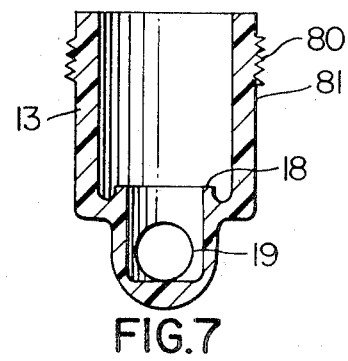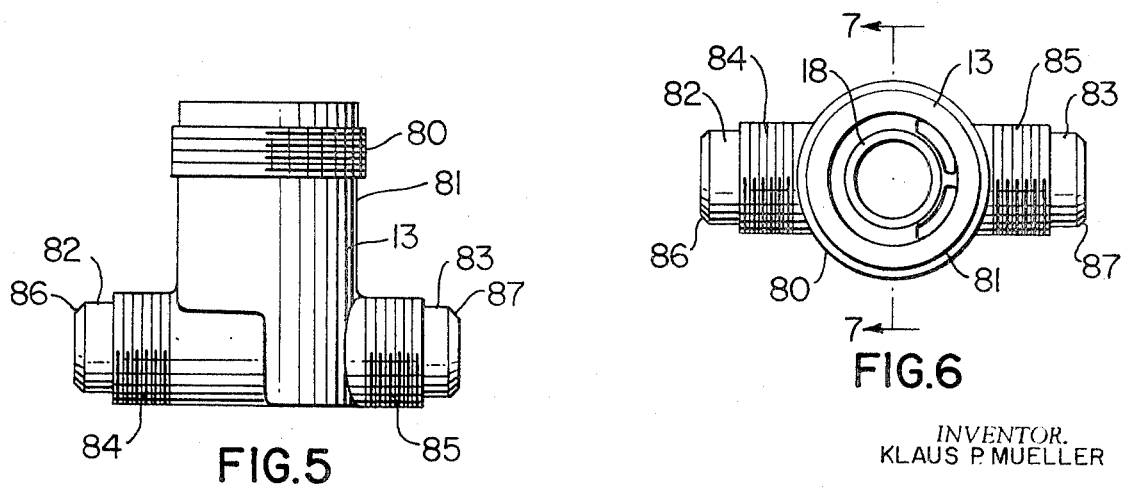

PNEUMATICALLY OPERATED VALVE MEANS AND PARTS THEREFORE OR THE LIKE

This invention relates to a pneumatically operated device, such as a pneumatically operated valve means, as well as to improved parts for such a pneumatically operated device or the like.

It is well known that pneumatically operated valve means have been provided in the past wherein a pneumatic signal is directed to the pneumatically operated device to cause the valve member thereof to move either to an open position or to a closed position thereof, the valve member returning to the other position thereof when the pneumatic signal is terminated.

A feature of this invention is to provide improved structure for such a pneumatically operated device or the like.

In particular, one embodiment of this invention provides a pair of cup-shaped housing members respectively having open ends provided with cam-locking means that are adapted to cooperate together to secure the open ends of the housing members in compressed relation therebetween, a flexible diaphragm having an outer peripheral means thereof disposed between the compressed-together open ends of the housing members whereby the diaphragm means is sealed to the open ends of the housing members and cooperates with one of the housing members to define a pneumatic signal-receiving chamber therebetween. The flexible diaphragm is adapted to be operatively associated with a valve member to move the same relative to a valve seat means interconnected to one of the cup-shaped housing members.

The valve seat means of this invention can comprise a one-piece molded plastic structure having an inlet tubular portion and an outlet tubular portion separated by a valve seat controlled by the aforementioned valve member, cylindrical metal inserts being disposed respectively in the tubular inlet and outlet means to reinforce the rim structure thereof.

Accordingly, it is an object of this invention to provide an improved pneumatically operated device having one or more of the novel features set forth above or hereinafter shown or described.

Another object of this invention is to provide improved parts for such a pneumatically operated device or the like.

Other objects, uses and advantages of this invention are apparent from a reading of this description which proceeds with reference to the accompanying drawings forming a part thereof and wherein:

FIG. 4 is a view similar to FIG. 3 and illustrates the pneumatically operated device in another operating position thereof.

FIG. 5 is a side view of the valve seat means of this invention.

FIG. 6 is a top view of the valve seat means of FIG. 5.

FIG. 7 is a cross-sectional view taken on line 7-7 of FIG. 6.

Figure 1:
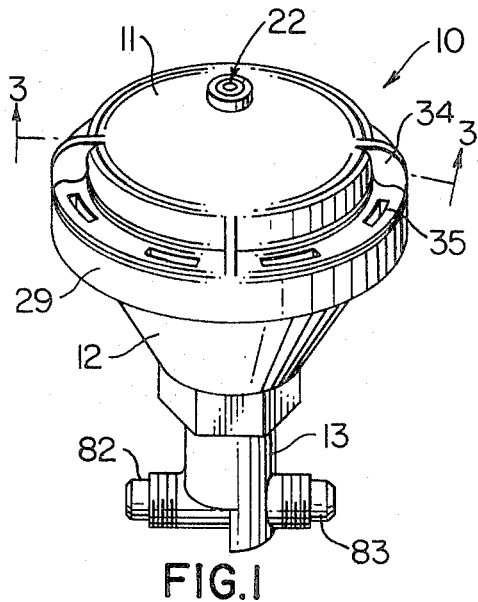
FIG. 1 is a top perspective view of the improved pneumatically operated device of this invention.

While the various features of this invention are hereinafter described and illustrated as being particularly adapted to provide a pneumatically operated valve means, it is to be understood that the various features of this invention can be utilized singly or in any combination thereof to provide other types of pneumatically operated devices as desired.

Therefore, this invention is not to be limited to only the embodiments illustrated in the drawings, because the drawings are merely utilized to illustrate one of the wide variety of uses of this invention.

Figure 2:
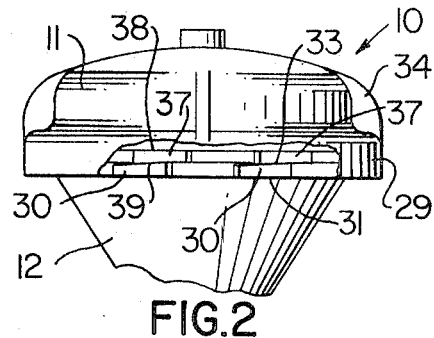
FIG. 2 is a fragmentary side view of the device of FIG. 1, with a portion thereof broken away to illustrate the cam-locking means of this invention.
Figure 3:
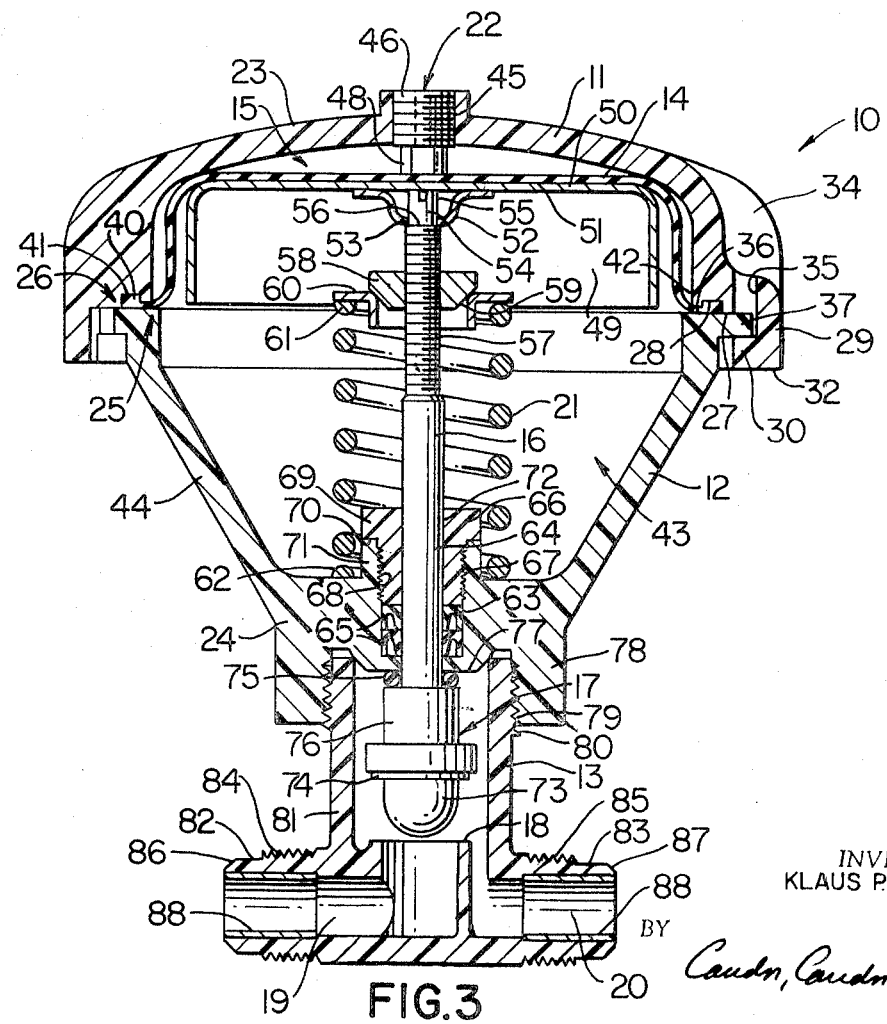
FIG. 3 is an enlarged cross-sectional view taken on line 3-3 of FIG. 1.

Referring now to FIGS. 1-3, the improved pneumatically operated valve means of this invention is generally indicated by the reference numeral 10 and comprises two cup-shaped housing members 11 and 12 detachable secured together in the manner hereinafter described, a valve seat means or fitting 13 being detachably secured to the housing member 12.

A flexible diaphragm 14 is carried by the housing members 11 and 12 in a manner hereinafter described to cooperate with the housing member 11 to define a chamber 15 therebetween, the flexible diaphragm 14 cooperating with a valve stem 16 having a valve head 17 on the lower end thereof that is adapted to open and close a valve seat 18 provided in the valve seat fitting 13 and separating an inlet passage means 19 from an outlet passage means 20.

A compression spring 21 normally tends to maintain the flexible diaphragm 14 in the deactuated position of FIG. 3 wherein the valve head 17 is disposed in its open position so that the fluid flow is permitted between the inlet means 19 and the outlet means 20. However, when a pressure fluid source (not shown) is directed to an opening means 22 formed in the cup-shaped housing member 11 in a manner hereinafter described to pressurize the chamber 15 of the device 10, the flexible diaphragm 14 is moved downwardly as illustrated in FIG. 4 by the resulting pressure differential across the diaphragm 14 in opposition to the force of the compression spring 21 to seat the valve head 17 against the valve seat 18 and thereby prevent fluid communication between the inlet means 19 and the outlet means 20.

The cup-shaped housing members 11 and 12 can each be formed as a molded one-piece plastic structure in the configuration illustrated in the drawings whereby the cup-shaped housing members 11 and 12 respectively have closed ends 23 and 24 and open ends 25 and 26.

The open end 25 of the cup-shaped housing member 11 is defined by an annular flat surface 27 having an annular groove 28 provided therein. An annular depending flange 29 is integrally formed at the open end 25 of the cup-shaped housing member 11 outboard of the flat surface 27 thereof and carries a plurality of inwardly directed wedge-shaped cam members 30 which have their lower surfaces 31 coplanar with the lower end 32 of the annular flange 29 and their upper surfaces 33 angularly disposed relative to the horizontal as illustrated in FIG. 2.

The annular flange 29 of cup-shaped housing member 11 is reinforced by a plurality of spaced and integral rib means 34 as illustrated in FIGS. 1-3. However, in order to insure flexibility of the annular flange 29 adjacent each cam or wedge member 30 thereof, opening means or slots 35 are formed through the cup-shaped housing member 11 in a manner to interrupt the flat surface 27 thereof above each cam member 30 as illustrated in FIG. 3 for a purpose hereinafter described.

The open end 26 of the other cup-shaped housing member 12 is also provided with a flat annular surface 36 and a plurality of spaced outwardly directed cam-locking means or wedge members 37 each having an upper surface 38 disposed coplanar with the flat end surface 36 and with a lower angular surfaces 39 that cooperates with the angular surface 33 of a cam member 30 on the housing member 11 in a manner now to be described.

The spacing between each pair of wedge members 37 on the housing member 12 is of a dimension to respectively permit a wedge member 30 of the housing member 11 to be inserted therethrough when aligned therewith. Likewise, the spacing between adjacent wedge members 30 of the housing member 11 is such that a wedge member 37 of the housing member 12 can be inserted therethrough when aligned therewith.

In this manner, when it is desired to assemble the cup-shaped housing members 11 and 12 together, the assembler places the open end 25 and 26 of the housing members 11 and 12 together and rotates one of the housing members 11 or 12 relative to the other whereby the cam members 37 of the housing member 12 become aligned with the spacings between the cam members 30 of the housing member 11 so that they can be inserted therethrough in telescopic relation and subsequently be moved relative thereto whereby the cooperating slanting surfaces 33 and 39 wedged together as illustrated in FIG. 2 to firmly compress the flat end surfaces 27 and 36 of the housing members 11 and 12 together in a simple and effective manner.

The flexible diaphragm 14 has an outer peripheral means 40 defined by an annular bead 41 which is adapted to be received in the annular groove 28 in the flat end surface 27 of the housing member 11, the flat end surface 27 being relieved between the annular groove 28 and the interior peripheral surface 42 thereof to accommodate the thickness of the flexible diaphragm 14 inboard of the annular bead 41 thereof so that the compressed relation between the open ends 25 and 26 of the housing members 11 and 12 through the cam-locking means 30 and 37 thereof will not cause a cutting into or adverse effect on the flexible diaphragm 14 inboard of the annular bead 41 thereof.

In this manner, it can be seen that when the outer peripheral means 40 of the flexible diaphragm 14 is disposed between the open ends 25 and 26 of the housing members 11 and 12 when the same are being assembled together in the manner set forth above, the resulting compressed relation between the flat end surfaces 27 and 36 of the housing members 11 and 12 likewise compresses the outer peripheral means 40 of the flexible diaphragm 14 therebetween to insure a positive sealing relationship therebetween whereby the flexible diaphragm 14 is secured to the housing members 11 and 12 and effectively seals the pneumatic signal-receiving chamber 15 between the flexible diaphragm 14 and the housing member 11 from a chamber 43 defined between the flexible diaphragm 14 and the end wall 24 of the cup-shaped housing member 12. However, the chamber 43 is adapted to be interconnected to the atmosphere in any suitable manner, such as by an opening means (not shown) passing through the frustoconical sidewall means 44 of the housing member 12 so as to prevent a dash pot effect of the chamber 43 in retarding movement of the flexible diaphragm 14 between its operating positions of FIGS. 3 and 4.

The end wall 23 of the housing member 11 is provided with a threaded bore 45 passing centrally therethrough and receives an externally threaded member 46 having the opening 22 passing therethrough, the lower end 47 of the member 46 having spaced abutment means 48 extending therefrom to space the diaphragm 14 from the passage means 22 and thereby eliminate upward movement of the diaphragm 14 to the position illustrated in FIG. 3 for a purpose hereinafter described.

A cup-shaped rigid diaphragm backing member 49 is adapted to have its closed end wall 50 abut against the underside 51 of the flexible diaphragm 14 in the manner illustrated in FIG. 3 and carries a small cup-shaped member 52 having an opening 53 passing therethrough and telescopically receiving a reduced end portion 54 of the valve stem 16 therethrough whereby the end 55 of the valve stem 16 abuts against the cup-shaped backing member 49 and the cup-shaped retainer 52 bears against a shoulder means 56 of the valve stem 16. The shoulder means 56 of the valve stem 16 defines one end of an externally threaded portion 57 of the valve stem 16. A nut 58 is threaded on the threaded portion 57 of the valve stem 16 and has a bevelled surface 59 adapted to be engaged by a spring-retaining washerlike member 60 which is forced thereagainst by the compression spring 21 having one end 61 thereof bearing against the retainer 60 and the other end 62 thereof bearing against the closed end wall 24 of the housing member 12.

In this manner, the compression spring 21 normally tends to move the valve stem 16 and, thus, the valve head 17 upwardly to maintain the valve seat 18 in its open condition, and, thus, through the interconnection of the valve stem 16 to the flexible diaphragm 14 by the cup-shaped members 49 and 52, tends to maintain the flexible diaphragm 14 in its uppermost position as illustrated in FIG. 3.

The closed end wall 24 of the cup-shaped housing member 12 has a stepped bore 63 passing therethrough to telescopically receive a cylindrical portion 64 of the valve stem 16 and permit axial movement thereof relative to the housing member 12 between its valve opening and closing positions. However, in order to seal the chamber 43 of the device 10 from the valve seat fitting 13, one or more U-shaped flexible annular sealing members 65 are disposed in the larger portion in the stepped bore 63 as illustrated in FIG. 3 and are held in compressed relation therein by an externally threaded member 66 having its threaded portion 67 threaded into an internally threaded portion 68 of the stepped bore 63 as illustrated in FIG. 3 whereby the head 69 of the threaded member 66 abuts against an end 70 of a tubular extension 71 integrally formed on the closed end wall 24 of the housing member 12. The threaded member 66 has a bore means 72 passing therethrough to telescopically receive the cylindrical portion 64 of the valve stem 16 to permit axial movement thereof relative thereto.

The valve stem 16 and valve head 17 can be formed from a one-piece molded plastic structure with the valve head 17 having a substantially hemispherically shaped end 73 adapted to be fully received through the valve seat 18 in the manner illustrated in FIG. 4 to center the valve head 17 relative thereto, an annular disclike portion 74 being formed on the valve head 17 above the hemispherical portion 73 to seat against the flat valve seat 18 in the manner illustrated in FIG. 4 to completely close the valve seat 18. For example, the disclike portion 74 can comprise a rubber disc molded to the valve head 17, if desired.

An O-ring 75 is adapted to be disposed around the cylindrical portion 64 of the valve stem 16 and be disposed against an enlarged cylindrical portion 76 of the valve head 17 as illustrated in FIG. 3 whereby the O-ring 75 is adapted to compress against the exterior flat surface 77 of the housing member 12 outboard of the stepped bore 63 thereof to further assure sealing of the stepped bore 63, and, thus, the chamber 43 from the valve seat fitting 13 when the valve head 17 is moved to its open position as illustrated in FIG. 3.

The closed end wall 24 of the housing member 12 is provided with a tubular extension 78 projecting downwardly therefrom and being internally threaded at 79 to threadedly receive a threaded portion 80 of the valve seat means 13 so that the valve seat means 13 can be readily attached to the housing member 12.

In particular, the valve seat means 13 can comprise a one-piece molded plastic structure formed in the configuration illustrated in FIG. 3 wherein a tubular extension 81 is concentrically disposed about the valve seat 18 and projects upwardly therefrom to carry the threaded portion 80 for threading into the tubular extension 78 of the housing member 12 to fasten the valve seat means 13 thereto. In addition, the inlet passage means 19 and outlet passage means 20 are defined by outwardly directed tubular extensions 82 and 83 which are externally threaded respectively at 84 and 85 so as to be suitably coupled to an inlet conduit means and to an outlet conduit means by conventional threaded coupling members or the like.

In order to reinforce the outer rim portions 86 and 87 of the tubular extensions 82 and 83, cylindrical metal inserts 88 can be respectively disposed in the passage means 19 and 20 as illustrated. For example, the cylindrical metal inserts 88 can be molded in place when the valve seat means 13 is molded, if desired, or such metallic inserts 88 can be inserted after the valve seat means 13 has been molded.

Therefore, it can be seen that the various parts of the pneumatically operated device 10 of this invention can be fabricated in a simple and economical manner by simple plastic molding operations and can be assembled together in a simple and effective manner as previously described to provide the pneumatically operated valve means which operates in the manner previously described.

Thus, not only does this invention provide an improved pneumatically operated device, but also this invention provides improved parts for such a pneumatically operated device or the like.

What I claim is:

1. A pneumatically operated device comprising a pair of cup-shaped housing members respectively having open ends, said open ends respectively having cam-locking means cooperating together to secure said open ends of said housings together in compressed relation therebetween, and a flexible diaphragm having an outer peripheral means disposed between said compressed-together open ends of said housing members whereby said diaphragm means is sealed to said open ends of said housing members and cooperates with one of said housing members to define a chamber therebetween, one of said housing members having an annular flange extending therefrom at said open end thereof telescoping about said open end of said other housing member, said cam lock means of said one housing member comprising a plurality of wedge-shaped members extending inwardly from said annular flange in spaced and circumferential relation about the inside surface of said annular flange and each having an angularly disposed flat wedging surface, said other housing member having a plurality of outwardly directed wedge-shaped embers disposed in spaced and circumferential relation about the outside surface of said open end of said other housing member and each having an angularly disposed flat wedging surface facing in the opposite direction to said wedging surfaces of said one housing member while wedging thereagainst to secure said housing members together and to progressively compress said diaphragm therebetween as said wedging action is increased.

2. A pneumatically operated device as set forth in claim 1 wherein said cam means are respectively integral with said housing members.

3. A pneumatically operated device as set forth in claim 2 wherein each housing member and its respective cam-locking means comprise a one-piece molded plastic structure.

4. A pneumatically operated device as set forth in claim 1 wherein said one housing member has opening means passing through said open end thereof inboard of said annular flange and in aligned relation with said wedge members to render said annular flange flexible in areas adjacent said wedge members carried thereby.

5. A pneumatically operated device as set forth in claim 1 wherein said open ends of said housing members each has a flat annular surface mating with the flat annular surface of the other housing member.

6. A pneumatically operated device as set forth in claim 5 wherein said wedge members of said other housing member are coplanar with said flat annular surface of said other housing member.

7. A pneumatically operated device as set forth in claim 5 wherein one of said housing members has an annular groove provided in said flat annular surface thereof, said flexible diaphragm having an annular bead at said outer peripheral means thereof received in said annular groove.

8. A pneumatically operated device as set forth in claim 1 wherein one of said housing members carries a valve seat means, a valve member being carried by said housing member carrying said valve seat means and being operatively associated with said diaphragm to be moved thereby to open and close said valve seat means.

9. A pneumatically operated device as set forth in claim 8 wherein said valve seat means has an inlet and an outlet interconnected together by a valve seat.

10. A pneumatically operated device as set forth in claim 9 wherein said valve seat means is a one-piece molded plastic structure detachably secured to said housing member carrying said valve member.

11. A pneumatically operated device comprising a pair of cup-shaped housing members respectively having open ends, said open ends respectively having cam-locking means cooperating together to secure said open ends of said housings together in compressed relation therebetween, and a flexible diaphragm having an outer peripheral means disposed between said compressed together open ends of said housing members whereby said diaphragm means is sealed to said open ends of said housing members and cooperates with one of said housing members to define a chamber therebetween, one of said housing members carrying a valve seat means, a valve member being carried by said housing member carrying said valve seat means and being operatively associated with said diaphragm to be moved thereby to open and close said valve seat means, said valve seat means having an inlet and an outlet interconnected together by a valve seat, said valve seat means being a one-piece molded plastic structure detachably secured to said housing member carrying said valve member, said inlet and said outlet of said valve seat means being defined in part by outwardly directed tubular extensions, and cylindrical metallic inserts being disposed respectively in said tubular extensions to reinforce the outer edges of said tubular extensions.

12. A pneumatically operated device as set forth in claim 11 wherein said tubular extensions have external threads thereon.